(12) United States Patent
Liu et al.

(10) Patent No.: US 8,731,094 B2
(45) Date of Patent: May 20, 2014

(54) METHOD AND DEVICE FOR DECODING OF PRECODED SIGNALS

(75) Inventors: Jinhua Liu, Beijing (CN); Qingyu Miao, Beijing (CN); Erik Larsson, Uppsala (SE); Andreas Jussi Peter Richard Cedergren, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 51 days.

(21) Appl. No.: 13/562,700

(22) Filed: Jul. 31, 2012

(65) Prior Publication Data

US 2013/0034180 A1    Feb. 7, 2013

(30) Foreign Application Priority Data

Aug. 2, 2011 (CN) .......................... 2011 1 0219394

(51) Int. Cl.
*H04B 7/02* (2006.01)
(52) U.S. Cl.
USPC ........... 375/267; 375/260; 375/262; 375/295; 375/316; 375/340
(58) Field of Classification Search
USPC ......... 375/260, 262, 264, 267, 271, 282, 295, 375/299, 302, 316, 322, 328, 332, 340, 342, 375/347, 350
See application file for complete search history.

(56) References Cited

U.S. PATENT DOCUMENTS

| 8,411,783 | B2 * | 4/2013 | Doron et al. | 375/267 |
| 8,467,475 | B2 * | 6/2013 | Khojastepour | 375/299 |
| 8,565,360 | B1 * | 10/2013 | Sun et al. | 375/347 |
| 2009/0285325 | A1 * | 11/2009 | Zhou | 375/267 |
| 2011/0045783 | A1 * | 2/2011 | Luschi et al. | 455/69 |
| 2012/0114064 | A1 * | 5/2012 | Kotecha et al. | 375/295 |
| 2012/0207238 | A1 * | 8/2012 | Tan et al. | 375/267 |
| 2012/0213310 | A1 * | 8/2012 | Ko et al. | 375/295 |
| 2012/0258729 | A1 * | 10/2012 | Siomina et al. | 455/456.1 |
| 2012/0275411 | A1 * | 11/2012 | Kim et al. | 370/329 |

(Continued)

FOREIGN PATENT DOCUMENTS

| WO | 2012148341 A2 | 11/2012 |
| WO | 2012148342 A1 | 11/2012 |

OTHER PUBLICATIONS

Qualcomm Incorporated, "SI proposal for Uplink MIMO," 3GPP TSG-RAN Meeting #50, Dec. 7-10, 2010, Istanbul, Turkey, RP-101432.

(Continued)

*Primary Examiner* — Hirdepal Singh
(74) *Attorney, Agent, or Firm* — Coats and Bennett PLLC (57) ABSTRACT

The present invention relates to a method and a device for decoding precoded signals in a wireless communication system and network node or terminal associated therewith. The wireless communication system comprises a sender and a receiver that share a codebook containing a plurality of precoding matrices. The sender precodes at least a data signal to be transmitted with one of the plurality of precoding matrices. Said method comprising receiving signals from the sender, estimating a channel between the sender and the receiver based on a part of received signals that is known a priori, evaluating relevancies of precoding matrices in said codebook to a precoded signal in the received signals based on at least the estimated channel and the codebook according to a predetermined criterion, and selecting a precoding matrix with maximum relevancy by comparing the evaluated relevancies, and applying the selected precoding matrix for decoding the received precoded signal.

13 Claims, 8 Drawing Sheets

(56) References Cited

U.S. PATENT DOCUMENTS

| | | | |
|---|---|---|---|
| 2013/0028344 A1* | 1/2013 | Chen et al. | 375/267 |
| 2013/0058296 A1* | 3/2013 | Jitsukawa | 370/329 |
| 2013/0094548 A1* | 4/2013 | Park | 375/219 |

OTHER PUBLICATIONS

Huawei, "New WI proposal: Uplink Transmit Diversity for HSPA," 3GPP TSG-RAN Meeting #50, Dec. 7-10, 2010, Istanbul, Turkey, RP-101438.

Qualcomm Incorporated, "Link Analysis of mechanisms to improve impact of phase discontinuity due to CLTD on NodeB receiver," 3GPP TSG RAN WG1 Meeting #64, Feb. 21-25, 2011, Taipei, Taiwan, R1-110664.

Qualcomm Incorporated, "PCI Feedback Link Analysis due to Antenna Imbalance," 3GPP TSG RAN WG1 Meeting #65, Feb. 21-25, 2011, Barcelona, Spain, R1-111256.

Huawei et al, "Performance of absolute and recursive feedback methods," 3GPP TSG-RAN WG1 Meeting #65, May 9-13, 2011, Barcelona, Spain, R1-111264.

Chao, Y. et al., "Precoding for Codebook Selection in LTE," China New Telecommunications, Feb. 2010.

* cited by examiner

METHOD AND DEVICE FOR DECODING OF PRECODED SIGNALS

RELATED APPLICATION

This application claims the benefit under 35 U.S.C. §119 of Chinese Application Number 201110219394.6 filed in China on Aug. 2, 2011, which is incorporated herein by reference.

TECHNICAL FIELD

The present invention relates to decoding in a wireless communication system and, in particular, to a method and a device for decoding precoded signals.

BACKGROUND

As a part of the evolution of the Third Generation Partnership Project (3GPP) High Speed Packet Access (HSPA), both uplink transmit diversity (ULTD) and uplink multiple input, multiple output (UL MIMO) schemes are considered. Open-loop and closed-loop transmit diversity (referred to as OLTD and CLTD) are 3GPP Release-11 work items, whereas UL MIMO is a Release-11 study item. These schemes may be exploited to improve uplink spectral efficiency (peak-rate) and uplink coverage. In 3GPP RAN 50 meeting, CLTD was accepted as a work item. CLTD includes both closed-loop beam forming (CLBF) and closed-loop antenna switching (CLAS), but in general CLBF is considered to be of primary interest. In the same meeting, UL MIMO was proposed as a study item.

Figure 1:
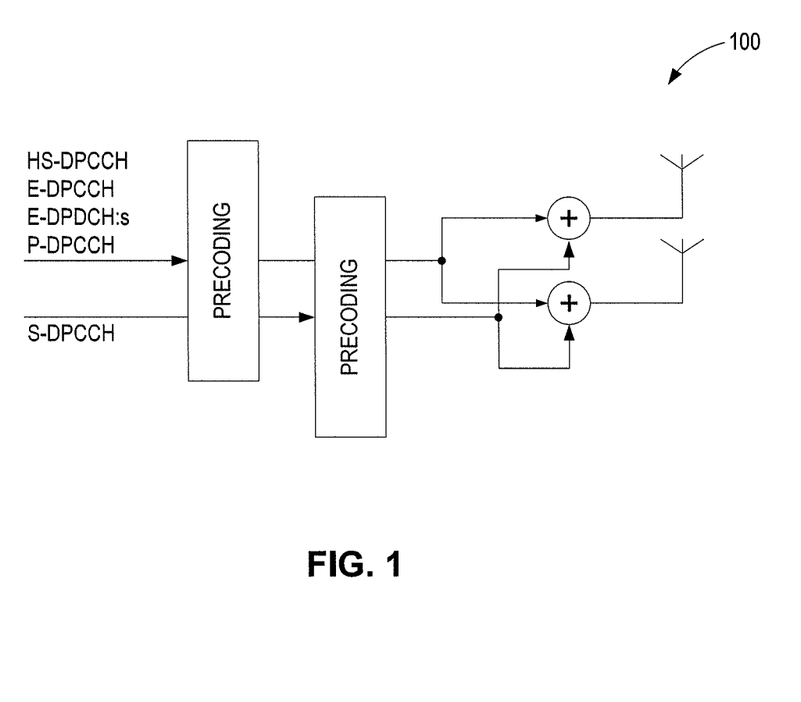
FIG. 1 shows a UE structure for use in UL CLTD.
Figure 2:
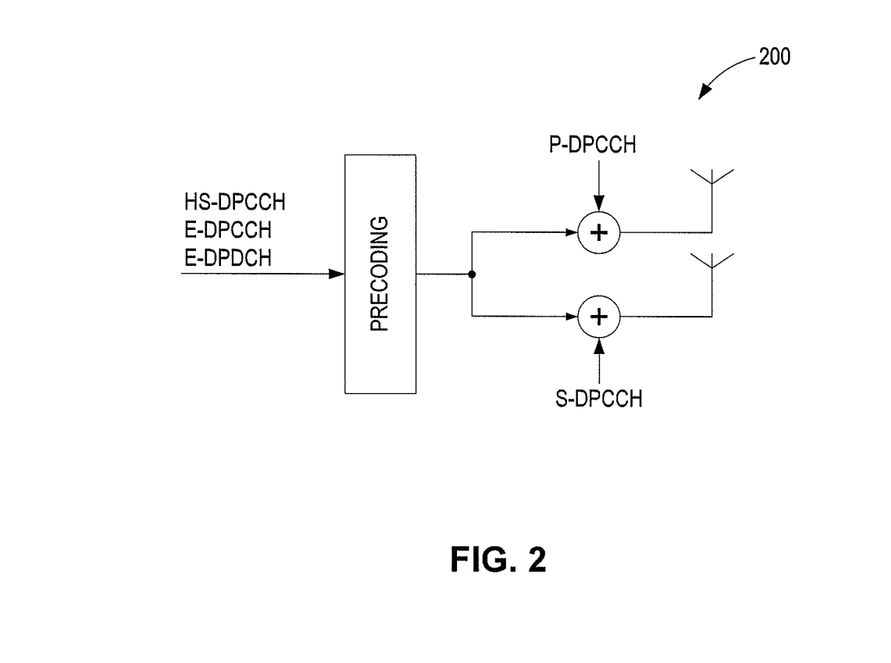
FIG. 2 shows another UE structure for use in UL CLTD.

In order to improve system performance, a precoding technology is introduced into the above schemes. FIGS. 1 and 2 illustrate two user equipment (UE) structures for uplink closed-loop transmit diversity (UL CLTD) where such precoding technology is used.

In the UE structure 100 shown in FIG. 1, the Dedicated Physical Control Channels (DPCCHs) are precoded. The primary DPCCH (P-DPCCH) is precoded with the same precoding vector (often referred to as the primary precoding vector) as other channels such as the High Speed Dedicated Physical Control Channel (HS-DPCCH), the Enhanced Dedicated Physical Control Channel (E-DPCCH), and the Enhanced Dedicated Physical Data Channel (E-DPDCH). The secondary DPCCH (S-DPCCH) is precoded with another secondary precoding vector, which is preferably orthogonal to the primary precoding vector. Since the P-DPCCH is precoded with the same precoding matrix as that of the data stream, pilots associated with the P-DPCCH will see the same composite channel (also called effective channel) (i.e., spatial composite channel generated by precoding the raw channel) as that of for the data stream. With such a structure, existing defined physical channel power offsets relative to DPCCH may be reused.

Figure 3:
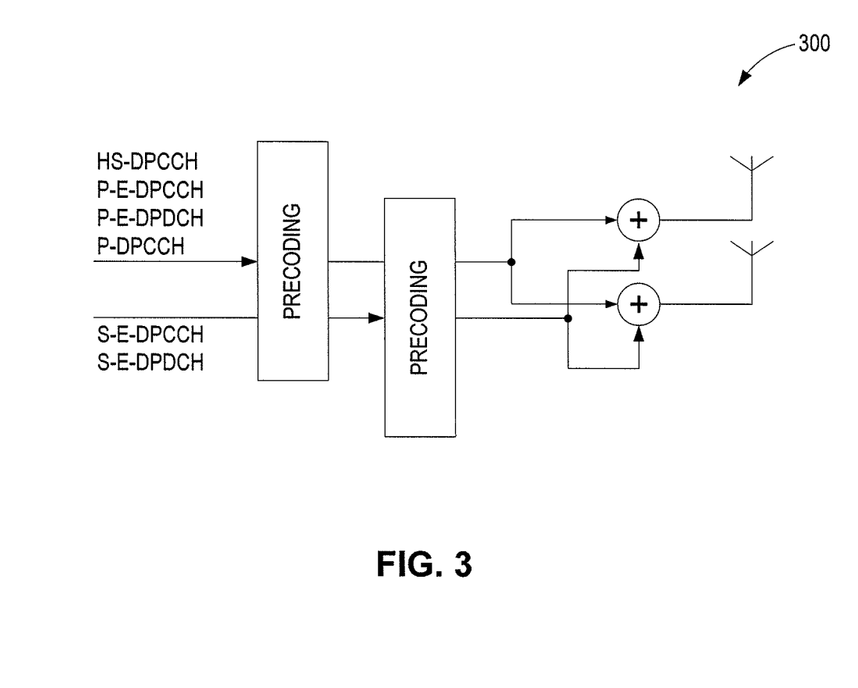
FIG. 3 shows a UE structure for use in UL MIMO.
Figure 4:
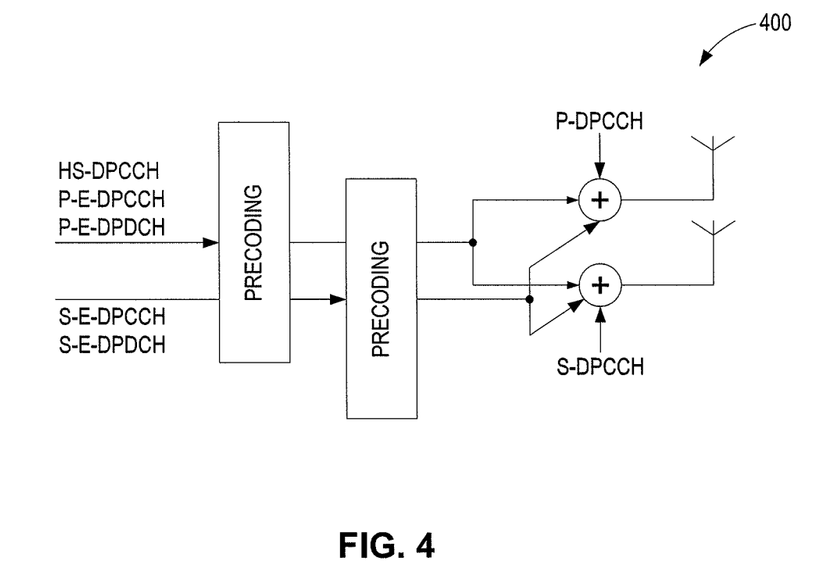
FIG. 4 shows another UE structure for use in UL MIMO.

FIG. 2 shows another UE structure 200 where the P-DPCCH and S-DPCCH are not precoded. In this case the existing definitions of physical channel power offsets relative to DPCCH should be updated. In 3GPP the current discussions seem to favor a precoded DPCCH structure in order to simplify the CLTD implementation. UL CLTD may be seen as a special case of UL MIMO. UEs in UL MIMO mode may benefit from improved bit-rates in the uplink. With MIMO, for example, up to two streams may be transmitted from different virtual antennas at the same time. FIGS. 3 and 4 provide two typical examples on how the two streams are transmitted in UL MIMO where precoding technology is used.

FIG. 3 shows an UE structure 300 where the P-DPCCH and S-DPCCH are precoded with the same precoding matrix as that of the data streams. A precoding matrix is often assumed to be unitary, having precoding vectors that are orthogonal to each other. FIG. 4 shows a UE structure 400 where the P-DPCCH and S-DPCCH are not precoded. Comparing the two structures 300, 400, for CLTD, precoding the DPCCHs with the same precoding matrix as used for the data streams simplifies the E-DCH power offset design and may facilitate a simpler soft handover mechanism.

Selection of a precoding matrix is involved in a precoding procedure, and a codebook-based precoding matrix selection mechanism is typically used. For UL CLTD and MIMO, when performing precoding, a precoding matrix used by the UE is usually selected by the serving NodeB from a codebook containing a plurality of precoding matrices, and this selected precoding matrix is indicated to the UE via precoding information such as precoding matrix indicator (PCI). The PCI is transmitted to the UE in the downlink (DL) so that the UE may determine a precoding matrix for precoding based on the PCI. The UE may also indicate the precoding matrix used by it to the NodeB by transmitting a PCI in the uplink (UL). Generally, for a structure with precoded DPCCH, this is not mandatory, since the NodeB may correctly decode a data stream without explicit information about the PCI. However, for a structure with non-precoded DPCCH, this is usually necessary because the non-serving NodeB needs PCI information to get a composite channel in order to decode the data stream. One common point for both precoded and non-precoded DPCCH structures is that PCI notification/feedback transmitted by the UE in the uplink may help the NodeB monitor a PCI transmission error in the downlink.

For both UL CLTD and MIMO, there is a possibility that the UE can receive a wrong PCI indication if a PCI transmission error occurs in the DL. Similarly, the NodeB may also receive a wrong PCI notification if a PCI transmission error occurs in the UL. Thus, the PCI received by the UE may not be the same as the PCI selected by NodeB, or the PCI received by the NodeB may not be the same as the PCI actually used by UE. In either case, the PCI assumed to be used by the UE as determined in the NodeB will be inconsistent with the PCI actually used by the UE. As a result, a mismatch between the precoding matrix assumed by the NodeB to be used by the UE and the precoding matrix actually used by the UE appears.

A PCI mismatch may affect at least several algorithms in the NodeB. In the scenario where the DPCCH is not precoded in UE, the NodeB requires a precoding matrix to decode received signals. A mismatched precoding matrix may result in decrease of decoding performance. In the scenario where the DPCCH is precoded in the UE, the NodeB requires a precoding matrix to perform raw channel estimation in order to select a precoding matrix for subsequent uplink transmission. A mismatched precoding matrix may result in wrong raw channel estimation and non-optimal precoding matrix selection. The same problem also exists in downlink MIMO. 3GPP simulations show that there is significant performance loss due to PCI transmission error.

Some schemes have been proposed to solve the above problems, where PCI/RI (rank indicator) is discarded when the downlink signal quality is worse than expected. In one scheme, if the estimated reception quality of present precoding information PCI sent from the NodeB is determined to be unreliable by the UE, the UE applies a pre-determined precoding matrix, or the most recently received PCI with good reception quality instead. Channel synthesis and filtering are also suggested to improve reception quality and channel estimation so as to increase the PCI transmission quality. However, none of these schemes solve the problems caused by PCI transmission errors.

SUMMARY

An object of the present invention is to provide an improved method and device that mitigates, obviates, and even eliminates the one or more of the problems mentioned above.

According to a first aspect of the present invention, a method is provided for decoding precoded signals in a wireless communication system. The wireless communication system comprises a sender and a receiver that share a codebook containing a plurality of precoding matrices. The sender precodes at least a data signal to be transmitted with one of the plurality of precoding matrices. In one exemplary embodiment of the method, the receiver receives signals from the sender and estimates a channel between the sender and the receiver based on a part of the received signals that is known a priori. The receiver evaluates relevancies of precoding matrices in the codebook to a precoded signal in the received signals based on at least the estimated channel and the codebook according to a predetermined criterion, selects a precoding matrix with the maximum relevancy based on a comparison of the evaluated relevancies, and applies the selected precoding matrix to decode the received precoded signal.

According to one embodiment of the present invention, the part of the received signals that is known a priori is precoded with same precoding matrix as the data signal, and the composite channel between the sender and the receiver is estimated based on the part of received signals that is known a priori.

In some embodiments, evaluating relevancies of precoding matrices in the codebook to a precoded signal in the received signals comprises estimating the precoding matrix applied by the sender based on the estimated composite channel and a previously estimated raw channel, and determining similarities between the estimated precoding matrix and individual precoding matrices in the codebook according to a matrix similarity criterion to evaluate the relevancies. Selecting a precoding matrix comprises selecting a precoding matrix with the maximum similarity as the precoding matrix with the maximum relevancy.

In some embodiments, evaluating relevancies of precoding matrices in the codebook to a precoded signal in the received signals comprises generating respective composite channels based on a previously estimated raw channel and respective precoding matrices in the codebook, and determining a matching degree between the estimated composite channel and individual generated composite channels according to a channel matching criterion to evaluate the relevancies. The selecting step comprises selecting a precoding matrix corresponding to the generated composite channel with the closest matching degree as the precoding matrix with the maximum relevancy.

In some embodiments, evaluating relevancies of precoding matrices in the codebook to a precoded signal in the received signals comprises generating respective raw channels based on the estimated composite channel and respective precoding matrices in the codebook, and determining matching degree between a previously estimated raw channel and individual generated raw channels according to a channel matching criterion to evaluate the relevancies. The selecting step comprises selecting a precoding matrix corresponding to the generated raw channel with the closest matching degree as the precoding matrix with the maximum relevancy.

According to another embodiment of the present invention, the part of the signals that is known a priori is not precoded and a raw channel between the sender and the receiver is estimated based on the part of the signals that is known a priori.

In some embodiments, evaluating relevancies of precoding matrices in the codebook to a precoded signal in the received signals comprises generating respective estimations for the data signal transmitted by the sender based on the estimated raw channel and respective precoding matrices in the codebook, and computing values of a target value function for individual generated estimations according to a predetermined target value function to evaluate the relevancies. The selecting step comprises selecting a precoding matrix corresponding to the estimation with the optimum value of the target value function as the precoding matrix with the maximum relevancy.

In some embodiments, the part of signals that is known a priori comprises a pilot in a control signal.

According to yet another embodiment of the present invention, the receiver has in advance precoding information about the precoding matrix applied by the sender. Evaluating relevancies of precoding matrices in the codebook to a precoded signal in the received signals comprises evaluating the relevancy of a precoding matrix that corresponds to the precoding information to the precoding signal in the received signals at first, and if the relevancy is higher than a predetermined threshold. Selecting the precoding matrix comprises selecting the precoding matrix that corresponds to the precoding information as the precoding matrix with the maximum relevancy.

According to a further embodiment of the present application, the wireless communication system employs uplink transmission diversity or uplink multiple-input multiple-output (UL MIMO) or downlink multiple-input multiple-output (DL MIMO) technology, wherein one of the sender and the receiver is user equipment (UE), and the other is a base station.

According to another aspect of the present invention, a device is provided for decoding precoded signals in a wireless communication system. The wireless communication system comprises a sender and a receiver, the sender and the receiver sharing a codebook containing a plurality of precoding matrices. The sender precodes at least a data signal to be transmitted with one of the plurality of precoding matrices. In one exemplary embodiment, the device comprises a receiving unit for receiving signals from the sender; an estimator for estimating a channel between the sender and the receiver based on a part of the received signals that is known a priori; a relevancy evaluator for evaluating relevancies of precoding matrices in the codebook to a precoded signal in the received signals based on at least the estimated channel and the codebook according to a predetermined criterion; and a selector for selecting a precoding matrix with the maximum relevancy by comparing the evaluated relevancies. The selected precoding matrix is applied by the receiver for decoding received precoded signals.

In some embodiments, the device comprises a network node. The device may be NodeB, e-NodeB or base station.

In some embodiment, the device comprises a terminal, such as a user equipment.

According to embodiments of the present invention, determining the precoding matrix at the receiver independent of the precoding information reduces negative impacts from PCI transmission errors for closed-loop multiple antenna transmissions, etc. (e.g., UL CLTD and UL MIMO).

Moreover, according to embodiments of the present invention, a precoding information transmission error may be independently corrected by a receiver, therefore, no feedback from a sender is required, which on the one hand avoids the impact of additional transmission error introduced by PCI feedback from the sender, and on the other hand reduces the impact on an uplink control channel (e.g. complexity and resource consumption, etc.). Also, this is a more network controllable scheme in terms of uplink transmission.

BRIEF DESCRIPTION OF THE DRAWINGS

Now the embodiments of the present invention are described, by way of example only, with reference to the accompanying drawings, wherein.

DETAILED DESCRIPTION

The skilled person will appreciate that the following description is provided for explanation rather than limitation. The skilled person will also appreciate that there are possible many variations within the spirit of the present invention and the scope of the attached claims. In order not to obscure the present invention, unnecessary details of known functions and structures are omitted from the current description.

The present invention applies for a wireless communication system using precoding technology, in particular, a wireless communication system using closed-loop transmit diversity or MIMO. The wireless communication system may be, for example, TD-SCDMA, CDMA2000, LTE, etc.

Before the embodiments of the present invention are described, the transmission structure of a wireless communication system using precoding technology is first briefly explained. The wireless communication system generally comprises a sender and a receiver communicating with each other. For UL CLTD and UL MIMO, the sender is a UE, and the receiver is a base station, which is also referred to as a NodeB. Signal r received at the front end of the receiver may be expressed as:

$$r = HWS = Hw_1 s_1 + Hw_2 s_2 = H_{\text{eff},1} s_1 + H_{\text{eff},2} s_2 \quad \text{Eq. 1}$$

where $S = [s_1 \ s_2]^T$, with $s_i$ denoting the signal for stream i, H is the channel matrix for the raw channel. To simplify, a single-tap 2×2 channel matrix H is considered. The single tap channel H is given by:

$$H = \begin{bmatrix} h_{11} & h_{12} \\ h_{21} & h_{22} \end{bmatrix} \quad \text{Eq. 2}$$

where $h_{kl}$ denotes a channel response corresponding to the raw channel between transmit antenna l of UE and receive antenna k of NodeB, and W is the precoding matrix. The precoding matrix W is given by:

$$W = [w_1 \ w_2] = \begin{bmatrix} w_{11} & w_{21} \\ w_{21} & w_{22} \end{bmatrix} \quad \text{Eq. 3}$$

where $w_1$ and $w_2$ are precoding vectors (also called precoding weights) associated with stream 1 and stream 2, respectively. The sender precodes stream 1 and stream 2 using precoding vectors $w_1$ and $w_2$ respectively. HW denotes a channel matrix for the composite channel (i.e., the effective channel generated by precoding the raw channel). Thereby, $H_{\text{eff},i}$ denotes the channel matrix for the composite channel associated with the stream i.

It should be noted that this is only a simplified transmission structure. The present invention is applicable to general transmission structures, including, for example an arbitrary number of receiver antennas, chips, or slots level processing, etc.

It may be seen from Eq. 1 that in order to demodulate and decode a data stream, a composite channel associated with the data stream needs to be estimated. For different UE structures, estimation of a composite channel may be performed in different ways. For example, if the P-DPCCH is precoded in a UE with the same precoding matrix as the primary data stream (e.g., the UE structures of FIG. 1 and FIG. 3), a composite channel required for decoding the primary data stream may be estimated based on the P-DPCCH pilot directly because the P-DPCCH pilot is known a priori. In this way, indication information about the precoding matrix will not be required at the NodeB. That is, the NodeB may receive data without precoding information (e.g., PCI). On the other hand, if a non-precoded DPCCH structure is used in the UE (e.g., the UE structures of FIG. 2 and FIG. 4), the NodeB may only estimate a raw channel based on the DPCCH pilot, and then precoding information will be required in order to determine the precoding matrix applied by the UE to get the composite channel.

In addition to demodulating and decoding the data stream, when the NodeB needs to select a precoding matrix for a UE for subsequent uplink transmission, it would be required to estimate the raw channel, i.e., in this case, what is required to estimate is no longer a composite channel combined with the precoding matrix. Also it may be seen from Eq. 1 that for a precoded DPCCH UE structure (see, e.g., FIG. 1 and FIG. 3), the NodeB needs explicit knowledge about the precoding matrix in order to estimate the raw channel and thereby select a precoding matrix for subsequent transmission, while for a non-precoded DPCCH UE structure (see, e.g., FIG. 2 and FIG. 4), the raw channel may be estimated based on the P-DPCCH pilot directly, hence, the precoding information is not required.

For a channel estimation procedure, it shall be particularly noted that, in general, channel estimation relies on channel averaging (filtering), i.e., a current channel estimation depends on (some) previous channel estimations. It is then assumed that the channel is stationary over a period for averaging, i.e., an averaging period. For a non-precoded DPCCH structure this is not a problem, since it is still the raw channel that is estimated. For a precoded DPCCH structure, however, more care should be taken. The reason is that if a composite channel $H_{\text{eff}} = HW$ is estimated, but the precoding matrix W changes during the averaging period, then the quality of the channel estimation will be degraded. In essence, the estimated composite channel in such a case is not stationary over the averaging period any longer. To circumvent this, a number of actions may be taken, including:

Ignoring that worse quality may be obtained when the composite channel is estimated and a time-averaging is performed on it based on the assumption that the change of precoding matrix has a same time-constant as the time-averaging (this should depend on Doppler frequency shift).

Resetting the channel estimation as soon as the precoding matrix changes.

Compensating for the precoding matrix (i.e., multiplied by an inverse matrix) before the time-averaging is performed by:

Estimating the instantaneous current composite channel $H_{\text{eff},t}$ using available pilots; or Compensating for the precoding matrix to get the instantaneous raw channel: $\hat{H}_t = \hat{H}_{\text{eff},t} W^{-1}$, and perform time-averaging on the raw channel $\hat{H} = \text{Average}(\hat{H}_t)$, $t \leq T$, where T is the time length of the averaging period.

Calculating the time-averaged composite channel by multiplying an averaged raw channel $\hat{H}$ with the precoding matrix W: $\hat{H}_{\text{eff}} = \hat{H} W$.

It may be seen from the above explanation that no matter what kind of structure a UE adopts as a sender, precoding information of a precoding matrix used by the UE may be always required at the receiver (e.g. NodeB) to perform various processing, including decoding the precoded data streams or channel estimation, etc. In order to get good decoding quality or channel estimation quality, it is important to maintain consistency of the precoding matrices used by the sender and the receiver. The precoding information used by the NodeB should be accurate and reliable.

Figure 5:
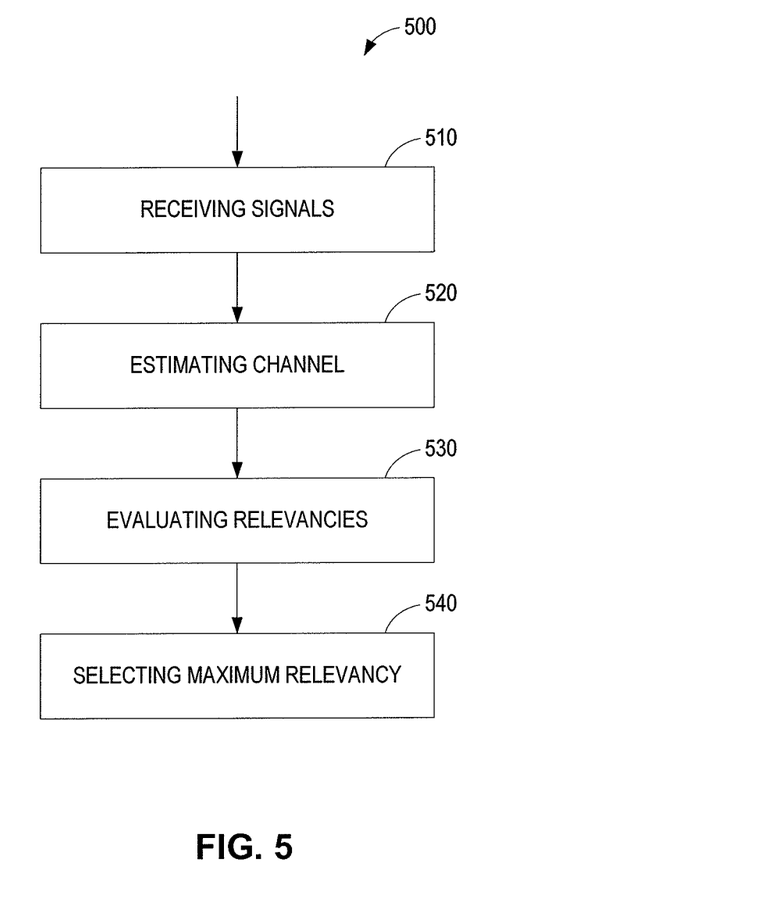
FIG. 5 shows a method for decoding precoded signals according to one embodiment of the present invention.

FIG. 5 shows a method 500 for decoding precoded signals in a wireless communication system according to one embodiment of the present invention. This wireless communication system comprises a user equipment UE (acting as a sender) and a NodeB (acting as a receiver). It will be appreciated that in other situations, the NodeB may act as a sender, while the UE may act as a receiver. The NodeB and the UE share a codebook containing a plurality of precoding matrices for precoding. When the UE transmits, at least the transmitted data signals are precoded with one of the precoding matrices, whereas other signals, depending on UE structure, may either be precoded with the same precoding matrix or not be precoded.

At step 510, the NodeB receives signals from the UE in the uplink. The signals may include data signals transmitted on data channels (e.g., E-DPDCH), and control signals transmitted on control channels (e.g., DPCCHs). Moreover, the signals may include a signal portion that is known a priori by the NodeB, such as pilots in the control signals.

When said signals are received, at step 520, the channels between UE and NodeB may be estimated based on the signal portion in the received signals that is known a priori. For example, according to Eq. 1, if the DPCCH pilots are precoded, then the composite channel HW between NodeB and UE may be estimated since both the signals r and S are obtained. However, if the DPCCH pilots are not precoded, then the raw channel H between these two may be estimated.

At step 530, relevancies of precoding matrices in the codebook to a received precoded signal in the received signals are evaluated according to a predetermined criterion. Here, the relevancy refers to a measure of possibility (or probability) that a precoding matrix in the codebook is used by the UE for the received precoded signals under current channel conditions (here with respect to the estimated channel). The higher a relevancy is, the greater the possibility of a corresponding precoding matrix being used by the UE for the received precoded signals is, and vice versa. This evaluation may be performed based on at least the estimated channel and the precoding matrices contained in the codebook. On an assumption that the raw channel is sufficiently stationary, the evaluation may also be performed using a previous estimated raw channel (matrix). This previously estimated raw channel may be a raw channel estimated for, e.g., a previous transmission time interval TTI, a previous time slot, a previous chip or a previous symbol, etc.

Since the relevancy is a measure, at step 540, a precoding matrix with the maximum relevancy may be selected by comparing the evaluated relevancies. The selected precoding matrix is considered to be the precoding matrix used by the UE for the received precoded signals. Therefore, it may be used by the NodeB to decode the received precoded signals. This selected precoding matrix may also be used in other subsequent precoding technologies related processing such as channel estimation.

For example, the NodeB may evaluate the relevancies of precoding matrices to received precoded signals based on the Minimum Mean Squared Error (MMSE) criterion. According to this criterion, the precoding matrix with the maximum relevancy may be expressed as follows:

$$\arg\min_k \|r - \hat{H}_{t-1} W_k S\|^2 \qquad \text{Eq. 4}$$

where r is the received signal (e.g., chip level or symbol level), $\hat{H}_{t-1}$ is the raw channel estimated for, e.g., the previous time slot, $W_k$ is the precoding matrix with index k in the codebook, and S is the transmitted signal.

Since a serving NodeB may transmit precoding information (e.g., PCI) in the downlink to indicate the selected precoding matrix to UE or may also receive information about the used precoding matrix from UE, the NodeB may have in advance the precoding information about the precoding matrix used by the UE. However, it will be appreciated that in some situations, a non-serving NodeB that receives signals from the UE may not have information about the precoding matrix used by UE.

If a NodeB has relevant precoding information, it may use the precoding information to determine whether a precoding information transmission error occurs when evaluating relevancies of precoding matrices to the received precoded signals, and make correction to precoding information accordingly.

In one example, when relevancies are evaluated, a precoding matrix corresponding to this precoding information may be selected from the codebook first so as to perform said evaluation. If the relevancy is higher than a certain predetermined threshold, then the precoding matrix indicated by the precoding information is considered to coincide with the precoding matrix used by the UE. Otherwise, it will be determined that a precoding information transmission error exists and relevancies of other precoding matrices in the codebook may be evaluated according to the method of the present invention to perform blind correction to the precoding information.

Since it is before demodulating and decoding received precoded signals that relevancies of precoding matrices to received precoded signals are evaluated at the NodeB to select the precoding matrix to be used, a possibility of using unmatched precoding matrices in a sender and a receiver due to precoding information (e.g., PCI) transmission error is greatly reduced, and the precoding performance of the system is improved.

Figure 6:
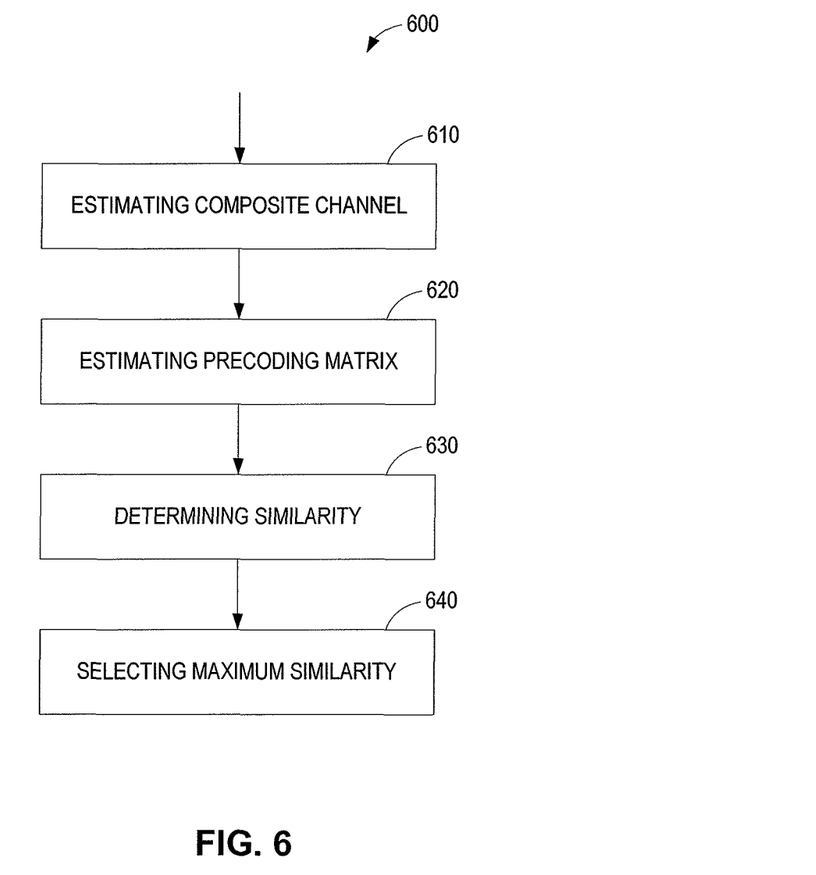
FIG. 6 shows a method for evaluating relevancies of precoding matrices according to one embodiment of the present invention.

FIG. 6 further shows a method 600 for evaluating relevancies of the precoding matrices according to one embodiment of the present invention. In this embodiment, the UE adopts a precoded DPCCH structure. When the UE transmits, the DPCCH is precoded with the same precoding matrix as the data signal. In this example, a composite channel may be estimated based on pilot signals on the DPCCH. The relevancies of precoding matrices in codebook to received precoded signals are then evaluated based on the estimated composite channel.

According to the present method, at step 610, the composite channel may be estimated by means of a pilot signal, for example, on the P-DPCCH and/or S-DPCCH in the current transmission time interval $TTI_n$. It will be appreciated that said estimation may also be performed using other precoded signals that are known a priori.

The pilot signal $r_{pilot}$ received at the front end of the receiver may be expressed as:

$$r_{pilot} = H_n W_n S_{pilot} \qquad \text{Eq. 5}$$

Where $S_{pilot}$ is the pilot signal transmitted by the UE, $H_n$ and $W_n$ are respectively the raw channel matrix and the precoding matrix used by the UE in $TTI_n$. Since the pilot signal $S_{pilot}$ is known a priori by the NodeB, the composite channel may be estimated according to Eq. 5. This estimation may be performed according to any general channel estimation method.

At step 620, based on an assumption that the raw channel is sufficiently stationary between two consecutive precoding matrix updates, the estimated composite channel $\hat{H}_n W_n$ and the estimated raw channel $\hat{H}_{n-1}$ in the previous transmission time interval $TTI_{n-1}$ may be used to estimate the precoding matrix $\hat{W}_n$ used by UE. It should be noted that a sufficient stationary may be satisfied for a raw channel in most low to moderate speed scenarios.

At step 630, the estimated precoding matrix $\hat{W}_n$ is compared with individual precoding matrices $W_k$ in said codebook to determine their similarity according to a matrix similarity criterion, and thereby evaluate the relevancies of respective precoding matrices to the received precoded signals. Generally, the larger the similarity, the higher the relevancy. The similarity between matrices may be determined in several ways, such as in a mean square sense.

At step 640, the precoding matrix in codebook with the maximum similarity with the estimated precoding matrix $\hat{W}_n$ is selected as the precoding matrix with the maximum relevancy.

In one example, the precoding matrix with the maximum relevancy may be expressed as follows:

$$\arg\max_{k} p(W_k | \hat{H}_{eff,t}, W_{estimate}, \hat{H}_{t-1}) \qquad \text{Eq. 6}$$

where $\hat{H}_{eff,t}$ is the instantaneously estimated composite channel (matrix), $W_{estimate}$ is the estimated precoding matrix used by the UE in transmitting, and $\hat{H}_{t-1}$ is the estimated raw channel for example in the previous time slot.

Preferably, it is assumed that a feedback bit error is independent and has an error probability $p_t$, then it may be considered that the precoding matrix with the maximum relevancy is given by:

$$\arg\min_k \beta (\hat{H}_{eff,t} - \hat{H}_{t-1} W_k)^H R_u^{-1} (\hat{H}_{eff,t} - \hat{H}_{t-1} W_k) - \sum_{bits\_W_k \ne W_{estimate}} \ln p_t - \sum_{bits\_W_k = W_{estimate}} \ln(1 - p_t) \qquad \text{Eq. 7}$$

where $R_u$ is an impairment covariance matrix and $\beta$ is a scale factor. To reduce complexity, only diagonal elements of $R_u$ are considered. The feedback bit error probability may be approximated with:

$$\hat{p}_t = \alpha \hat{p}_{t-1} + (1-\alpha)\frac{nbr\_bits\_W_k \ne W_{estimate}}{nbr\_bits\_W_k} \qquad \text{Eq. 8}$$

where $\alpha$ is a filter parameter, $nbr\_bits\_W_k$ is the number of bits to indicate the precoding matrix $W_k$, and $nbr\_bits\_W_k \ne W_{estimate}$ is the number of bits that are different between the bits to indicate the precoding matrix $W_k$ and the bits to indicate $W_{estimate}$ respectively.

Preferably, if a NodeB has precoding information associated with the precoding matrix used by a UE in advance, then it may detect a precoding information transmission error by comparing and determining whether the estimated precoding matrix coincides with the precoding matrix to which the precoding information corresponds, and evaluations of relevancies of other precoding matrices are performed only if a transmission error is detected. If no transmission error is detected, the NodeB uses the precoding information to determine the precoding matrix to be used.

The NodeB may estimate, for example, the raw channel of current $TTI_n$ based on the determined precoding matrix. (A filter might also be used for the raw channel). Since the estimated composite channel is $\hat{H}_n W_n$ and the determined precoding matrix used by UE is $W_n$, the NodeB may estimate based on these the raw channel $\hat{H}_n$ for precoding matrix selection and rank adaptation in subsequent uplink transmission of UE.

Alternatively, in another embodiment, relevancies of respective precoding matrices to the received precoded signals may be evaluated by comparison of the composite channels. According to this embodiment, the composite channel may also be estimated through P-DPCCH and/or S-DPCCH based on the data in current TTI. Meanwhile, a corresponding composite channel (i.e., corresponding composite channel estimation), is generated based on the estimation of the raw channel in the previous TTI and the respective precoding matrices in the codebook. The estimated composite channel is compared with individual generated composite channels according to a channel matching criterion to respectively determine their corresponding matching degree, and thereby evaluating relevancies of respective precoding matrices to the received precoded signals. The precoding matrix corresponding to the generated composite channel with the closest matching degree may be determined as the precoding matrix with the maximum relevancy.

The matching between composite channels may also be determined in a number of ways, for example, in a mean square sense. Namely, the precoding matrix with the maximum relevancy may be determined by:

$$\arg\min_k \|\hat{H}_{eff,t} - \hat{H}_{t-1} W_k\|^2 \qquad \text{Eq. 9}$$

where is $\hat{H}_{eff,t}$ is the instantaneously estimated composite channel (matrix), $W_k$ is the precoding matrix with index k in the codebook, and $\hat{H}_{t-1}$ is the raw channel estimated, for example, in the previous time slot.

Alternatively, in a further embodiment, relevancies of respective precoding matrices to the received precoded signals may be evaluated by comparing the raw channels. According to this embodiment, similarly, the composite channel is estimated through P-DPCCH and/or S-DPCCH based on the data in the current TTI. Then, a corresponding raw channel (i.e., corresponding raw channel estimation), is generated based on the estimated composite channel and the respective precoding matrices in the codebook. The previously estimated raw channel is compared with individual generated raw channels according to a channel matching criterion to respectively determine their corresponding matching degree, and thereby evaluating relevancies of respective precoding matrices to the received precoded signals. The precoding matrix corresponding to the generated raw channel with the closest matching degree may be determined as the precoding matrix with the maximum relevancy. Similarly, the matching of the raw channels may be determined in a number of ways (e.g. in a mean square sense).

It shall be noted that although the above exemplary procedures are performed in a TTI, alternatively, these procedures may also be performed at chip or symbol levels.

Figure 7:
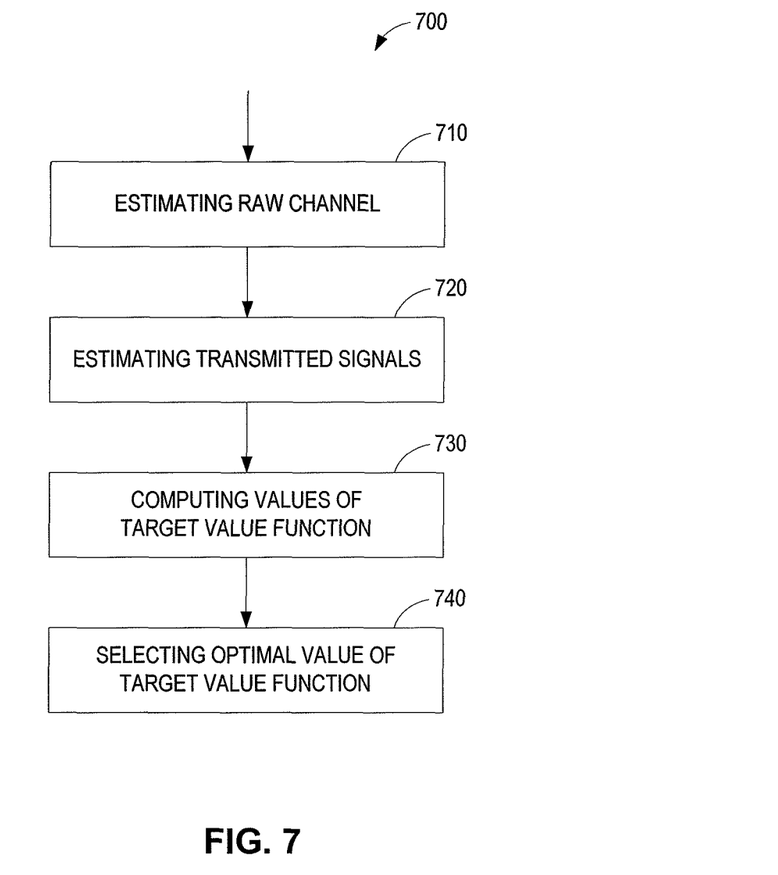
FIG. 7 shows a method for evaluating relevancies of precoding matrices according to a further embodiment of the present invention.

FIG. 7 shows a method 700 for evaluating relevancies of precoding matrices according to a further embodiment of the present invention. In this embodiment, a UE adopts a non-precoded DPCCH structure, in this way, when the UE transmits signals, the DPCCH pilots are not precoded. In this example, the relevancies may be evaluated by means of performing blind demodulation of the data portion.

In this example, at step 710, as stated above, the pilots transmitted on the DPCCH are used to estimate the raw channel. Based on the estimated raw channel and the respective precoding matrices in the codebook, at step 720, the NodeB may generate estimates of signal streams transmitted by the UE from the received signal streams. At step 730, respective values of a predetermined target value function for individual generated estimates are computed according to the target value function. For example, in one case the NodeB may demodulate data using different precoding matrices, and after demodulation, the signal-to-noise ratio (SINR) or the received signal code power (RSCP) of respective demodulated signals may be determined as their corresponding target value function values. In another case, the NodeB also uses different precoding matrices to further decode the data, and after decoding, the block error rate (BLER) or the bit error rate (BER) of respective decoded signals may be determined as their corresponding target value function values.

The target value function values corresponding to individual generated estimates are compared with one another to evaluate the relevancies of the corresponding precoding matrices. The target value function may be for example signal-to-noise ratio (SINR) or bit error rate (BER). At step 740, the precoding matrix corresponding to the generated estimation with the optimal target value function value (e.g., the highest SINR or lowest BER), may be determined as the precoding matrix with the maximum relevancy.

Preferably, when the NodeB has precoding information associated with the precoding matrix used by the UE in advance, it may detect whether a precoding information transmission error occurs by first determining whether the precoding matrix to which the precoding information corresponds provides optimal data transmission quality, and evaluating the relevancies of other precoding matrices and correction of precoding matrix only when a transmission error is detected.

Preferably, Doppler estimation is considered when performing compensation according to the method of the present invention. For example, if the Doppler frequency shift is too high, the precoding matrix blind estimation may hurt performance more than it improves (e.g., Doppler frequency shift is associated with PCI update rate). In such case, it might be beneficial to turn off this blind estimation procedure.

Preferably, there are several other alternatives for incorporating a priori information. For example, instead of MMSE, a Bayesian estimation framework may be used to make decision or add a constraint to the MMSE problems above. Note that in this case, delay of precoding information (e.g., PCI delay) (i.e., the time it takes for determining precoding information at the NodeB), will be known and be notified to the UE so that the UE may apply weights, and signals corresponding to the precoding information will be received at the NodeB.

Preferably, if a PCI delay is unknown, but is required, the above framework may be used to estimate a PCI delay by assuming no PCI errors.

Figure 8:
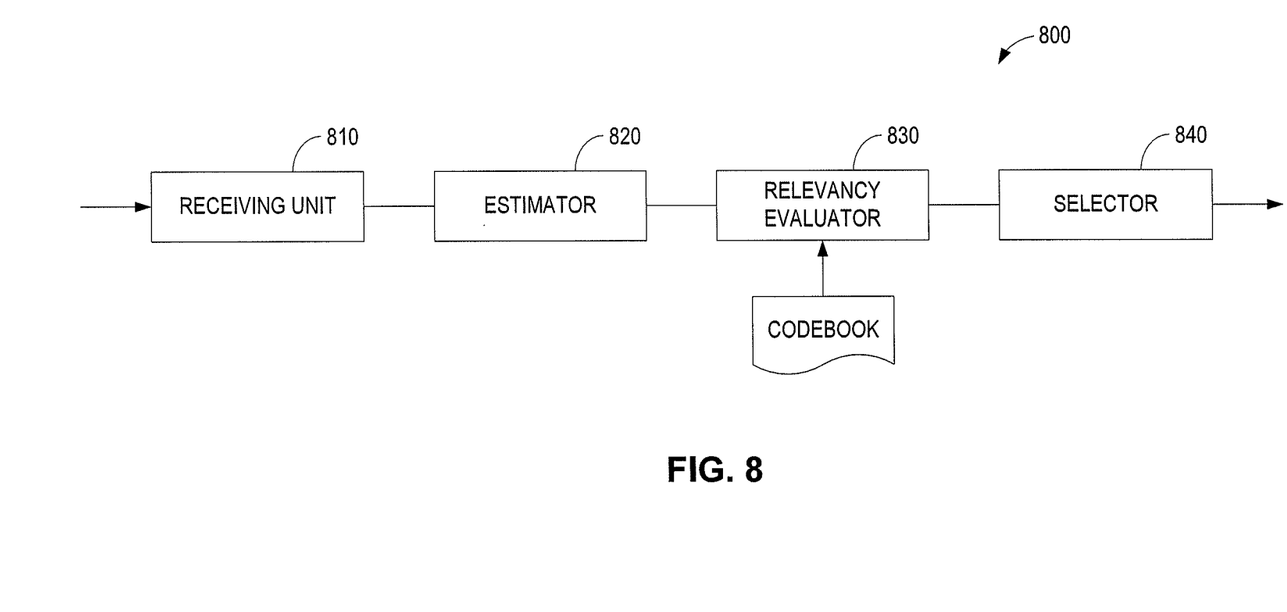
FIG. 8 shows a block diagram of a device for decoding precoded signals according to one embodiment of the present invention.

FIG. 8 shows a block diagram of device 800 for decoding precoded signals according to an embodiment of the present invention. The device 800 is used at the receiver side in the wireless communication system. It may either be integrated together with the receiver, or be implemented as a separate device. When the NodeB or UE serves as a receiver, it may comprise a device 800 according to the present invention.

As shown in FIG. 8, the device 800 comprises the following components: a receiving unit 810, an estimator 820, a relevancy evaluator 830 and a selector 840 that are operably coupled together.

The receiving unit 810 receives signals from a sender. The signals may include signals from different channels, including, for example, data signals from data channels and control signals from control channels. The receiver 810 sends the received signals to the estimator 820 which estimates the channel between the sender and the receiver based on a signal portion in the received signals that is known a priori. If the UE adopts a precoded DPCCH structure, the estimator 820 will estimate the composite channel. While if the UE adopts a non-precoded DPCCH structure, the estimator 820 will estimate the raw channel.

The estimator 820 notifies the estimated channel to the relevancy evaluator 830. The relevancy evaluator 830 evaluates relevancies of the precoding matrices to the received precoded signals at least based on the estimated channel and the precoding matrices contained in a codebook of the receiver according to a predetermined criterion. For example, the evaluation of relevancies may be performed according to the embodiments described with reference to FIGS. 6-7 and in other ways described above.

The selector 840 compares the evaluated relevancies and selects a precoding matrix with the maximum relevancy. The selected precoding matrix is used for decoding the received data signal or other processes in the receiver that pertains to the precoding matrix.

Through the scheme of the present invention, the processing such as decoding the precoded signals and channel estimation at the receiver will be protected from impact of a precoding information transmission error, thereby increasing gain in multiple antenna transmission.

It shall be noted that the above embodiments are only provided to facilitate the understanding of the present invention, rather than limiting the present invention. Although in respective embodiments, the present invention is described in the context of UL CLTD and 2×2 UL MIMO, it will be appreciated that the present invention may also be applicable in DL MIMO and MIMO systems with even higher rank or more antennae. Although in the illustrated wireless communication system, the sender and the receiver are set as NodeB and user equipment UE, it will be appreciated that the sender and the receiver may also be other network nodes and terminals that may communicate with each other using the precoding technology. It will also be appreciated that the NodeB serving as a base station might have different names in different wireless communication systems, for example, it is called e-NodeB in LTE system after some functions are adjusted.

Moreover, the skilled person would appreciate that the present invention may be embodied as a method, device or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Although specific embodiments have been illustrated and described herein, those of ordinary skill in the art will appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for decoding precoded signals in a wireless communication system comprising a sender and a receiver, said sender and said receiver sharing a codebook containing a plurality of precoding matrices, said sender precoding at least a data signal to be transmitted with one of the plurality of precoding matrices, said method comprising:
   receiving signals from the sender;
   estimating a composite channel between the sender and the receiver based on a part of the received signals that is known a priori;
   evaluating relevancies of precoding matrices in said codebook to a precoded signal in the received signals based on at least the estimated composite channel and the codebook according to a predetermined criterion, wherein the evaluating comprises:
      estimating the precoding matrix applied by the sender based on the estimated composite channel and a previously estimated raw channel; and
      determining similarities between the estimated precoding matrix and individual precoding matrices in said codebook according to a matrix similarity criterion to evaluate said relevancies;
   selecting a precoding matrix based on a comparison of the evaluated relevancies, wherein the selecting comprises selecting a precoding matrix with the maximum similarity as the precoding matrix with the maximum relevancy; and
   applying the selected precoding matrix for decoding the received precoded signal;
   wherein the part of the received signals that is known a priori is precoded with the same precoding matrix as the data signal.

2. The method of claim 1, wherein the part of the received signals that is known a priori comprises a pilot in a control signal.

3. The method of claim 1, wherein:
   said wireless communication system employs uplink transmission diversity or UL MIMO (uplink multiple-input, multiple-output), or DL MIMO (downlink multiple-input, multiple-output) technology; and
   one of said sender and said receiver is a user equipment, and the other is a base station.

4. A method for decoding precoded signals in a wireless communication system comprising a sender and a receiver, said sender and said receiver sharing a codebook containing a plurality of precoding matrices, said sender precoding at least a data signal to be transmitted with one of the plurality of precoding matrices, said method comprising:
   receiving signals from the sender;
   estimating a composite channel between the sender and the receiver based on a part of the received signals that is known a priori;
   evaluating relevancies of precoding matrices in said codebook to a precoded signal in the received signals based on at least the estimated composite channel and the codebook according to a predetermined criterion, wherein the evaluating comprises:
      generating respective composite channels based on a previously estimated raw channel and respective precoding matrices in said codebook; and
      determining a matching degree between the estimated composite channel and individual generated composite channels according to a channel matching criterion to evaluate said relevancies;
   selecting a precoding matrix based on a comparison of the evaluated relevancies, wherein the selecting comprises selecting a precoding matrix corresponding to the generated composite channel with the closest matching degree as the precoding matrix with the maximum relevancy; and
   applying the selected precoding matrix for decoding the received precoded signal;
   wherein the part of the received signals that is known a priori is precoded with the same precoding matrix as the data signal.

5. A method for decoding precoded signals in a wireless communication system comprising a sender and a receiver, said sender and said receiver sharing a codebook containing a plurality of precoding matrices, said sender precoding at least a data signal to be transmitted with one of the plurality of precoding matrices, said method comprising:
   receiving signals from the sender;
   estimating a composite channel between the sender and the receiver based on a part of the received signals that is known a priori,
   evaluating relevancies of precoding matrices in said codebook to a precoded signal in the received signals based on at least the estimated composite channel and the codebook according to a predetermined criterion, wherein the evaluating comprises:
      generating respective raw channels based on the estimated composite channel and respective precoding matrices in said codebook; and
      determining a matching degree between a previously estimated raw channel and individual generated raw channels according to a channel matching criterion to evaluate said relevancies;
   selecting a precoding matrix based on a comparison of the evaluated relevancies, wherein the selecting comprises selecting a precoding matrix corresponding to the generated raw channel with the closest matching degree as the precoding matrix with the maximum relevancy; and
   applying the selected precoding matrix for decoding the received precoded signal;
   wherein the part of the received signals that is known a priori is precoded with the same precoding matrix as the data signal.

6. A method for decoding precoded signals in a wireless communication system comprising a sender and a receiver, said sender and said receiver sharing a codebook containing a plurality of precoding matrices, said sender precoding at least a data signal to be transmitted with one of the plurality of precoding matrices, said method comprising:
    receiving signals from the sender;
    estimating a raw channel between the sender and the receiver based on a part of the received signals that is known a priori;
    evaluating relevancies of precoding matrices in said codebook to a precoded signal in the received signals based on at least the estimated raw channel and the codebook according to a predetermined criterion, wherein the evaluating comprises:
        generating respective estimations for the data signal transmitted by the sender based on the estimated raw channel and respective precoding matrices in said codebook; and
        computing values of a target value function for individual generated estimations according to a predetermined target value function to evaluate said relevancies;
    selecting a precoding matrix based on a comparison of the evaluated relevancies wherein the selecting comprises selecting a precoding matrix corresponding to the generated estimation with the optimum value of the target value function as the precoding matrix with the maximum relevancy; and
    applying the selected precoding matrix for decoding the received precoded signal;
    wherein the part of the received signals that is known a priori is not precoded.

7. A method for decoding precoded signals in a wireless communication system comprising a sender and a receiver, said sender and said receiver sharing a codebook containing a plurality of precoding matrices, said sender precoding at least a data signal to be transmitted with one of the plurality of precoding matrices, said method comprising:
    receiving signals from the sender;
    estimating a channel between the sender and the receiver based on a part of the received signals that is known a priori;
    evaluating relevancies of precoding matrices in said codebook to a precoded signal in the received signals based on at least the estimated channel and the codebook according to a predetermined criterion; and
    selecting a precoding matrix with the maximum relevancy based on a comparison of the evaluated relevancies, and applying the selected precoding matrix for decoding the received precoded signal;
    wherein said receiver has in advance precoding information on a precoding matrix applied by the sender;
    wherein evaluating relevancies of precoding matrices in said codebook to a precoded signal in the received signals comprises evaluating the relevancy of a precoding matrix that corresponds to said precoding information first; and
    wherein if the evaluated relevancy is higher than a predetermined threshold, then said selecting comprises selecting the precoding matrix that corresponds to said precoding information as the precoding matrix with the maximum relevancy.

8. A device for decoding precoded signals in a wireless communication system which comprises a sender and a receiver, said sender and said receiver sharing a codebook containing a plurality of precoding matrices, said sender precoding at least a data signal to be transmitted with one of the plurality of precoding matrices, said device comprising:
    a receiving circuit configured to receive signals from the sender;
    an estimator circuit configured to estimate a composite channel between the sender and the receiver based on a part of the received signals that is known a priori;
    a relevancy evaluator circuit for evaluating relevancies of precoding matrices in said codebook to a precoded signal in the received signals based on at least the estimated channel and the codebook according to a predetermined criterion; and
    a selector circuit for selecting a precoding matrix with the maximum relevancy by comparing the evaluated relevancies, the selected precoding matrix being applied by the receiver for decoding received precoded signals;
    wherein the part of the received signals that is known a priori is precoded with same precoding matrix as the data signal;
    wherein said relevancy evaluator circuit is configured to:
        estimate the precoding matrix applied by the sender based on the estimated composite channel and a previously estimated raw channel; and
        determine similarities between the estimated precoding matrix and individual precoding matrices in said codebook according to a matrix similarity criterion to evaluate said relevancies; and
    wherein said selector circuit is configured to select a precoding matrix with the maximum similarity as the precoding matrix with the maximum relevancy.

9. The device of claim 8, wherein the device is a network node.

10. The device of claim 8, wherein the device is a wireless terminal.

11. A device for decoding precoded signals in a wireless communication system which comprises a sender and a receiver, said sender and said receiver sharing a codebook containing a plurality of precoding matrices, said sender precoding at least a data signal to be transmitted with one of the plurality of precoding matrices, said device comprising:
    a receiving circuit configured to receive signals from the sender;
    an estimator circuit configured to estimate a composite channel between the sender and the receiver based on a part of the received signals that is known a priori;
    a relevancy evaluator circuit for evaluating relevancies of precoding matrices in said codebook to a precoded signal in the received signals based on at least the estimated channel and the codebook according to a predetermined criterion; and
    a selector circuit for selecting a precoding matrix with the maximum relevancy by comparing the evaluated relevancies, the selected precoding matrix being applied by the receiver for decoding received precoded signals;
    wherein the part of the received signals that is known a priori is precoded with same precoding matrix as the data signal;
    wherein said relevancy evaluator circuit is configured to:
        generate respective composite channels based on a previously estimated raw channel and respective precoding matrices in said codebook; and
        determine a matching degree between the estimated composite channel and individual generated composite channels according to a channel matching criterion to evaluate said relevancies; and
    wherein said selector circuit is configured to select a precoding matrix corresponding to the generated composite channel with the closest matching degree as the precoding matrix with the maximum relevancy.

12. A device for decoding precoded signals in a wireless communication system which comprises a sender and a receiver, said sender and said receiver sharing a codebook containing a plurality of precoding matrices, said sender precoding at least a data signal to be transmitted with one of the plurality of precoding matrices, said device comprising:
- a receiving circuit configured to receive signals from the sender;
- an estimator circuit configured to estimate a composite channel between the sender and the receiver based on a part of the received signals that is known a priori;
- a relevancy evaluator circuit for evaluating relevancies of precoding matrices in said codebook to a precoded signal in the received signals based on at least the estimated channel and the codebook according to a predetermined criterion; and
- a selector circuit for selecting a precoding matrix with the maximum relevancy by comparing the evaluated relevancies, the selected precoding matrix being applied by the receiver for decoding received precoded signals;
- wherein the part of the received signals that is known a priori is precoded with same precoding matrix as the data signal; and
- wherein said relevancy evaluator circuit is configured to:
    - generate respective raw channels based on the estimated composite channel and respective precoding matrices in said codebook; and
    - determine a matching degree between a previously estimated raw channel and individual generated raw channels according to a channel matching criterion to evaluate said relevancies; and
- wherein said selector circuit is configured to select a precoding matrix corresponding to the generated raw channel with the closest matching degree as the precoding matrix with the maximum relevancy.

13. A device for decoding precoded signals in a wireless communication system which comprises a sender and a receiver, said sender and said receiver sharing a codebook containing a plurality of precoding matrices, said sender precoding at least a data signal to be transmitted with one of the plurality of precoding matrices, said device comprising:
- a receiving circuit configured to receive signals from the sender;
- an estimator circuit configured to estimate a raw channel between the sender and the receiver based on a part of the received signals that is known a priori;
- a relevancy evaluator circuit for evaluating relevancies of precoding matrices in said codebook to a precoded signal in the received signals based on at least the estimated channel and the codebook according to a predetermined criterion; and
- a selector circuit for selecting a precoding matrix with the maximum relevancy by comparing the evaluated relevancies, the selected precoding matrix being applied by the receiver for decoding received precoded signals;
- wherein the part of the received signals that is known a priori is not precoded; and
- wherein said relevancy evaluator circuit is configured to:
    - generate respective estimations for the data signal transmitted by the sender based on the estimated raw channel and respective precoding matrices in said codebook; and
    - compute values of a target value function for individual generated estimations according to a predetermined target value function to evaluate said relevancies; and
- wherein said selector circuit is configured to select a precoding matrix corresponding to the generated estimation with the optimum value of the target value function as the precoding matrix with the maximum relevancy.

* * * * *